US012621703B2

(12) United States Patent
Ramamurthi et al.

(10) Patent No.: US 12,621,703 B2
(45) Date of Patent: May 5, 2026

(54) SYSTEMS AND METHODS FOR RADIO SCHEDULING WITH BLIND TRAFFIC CHARACTERIZATION

(71) Applicant: Verizon Patent and Licensing Inc., Basking Ridge, NJ (US)

(72) Inventors: Vishwanath Ramamurthi, San Ramon, CA (US); Arda Aksu, Lafayette, CA (US); Wei David Huang, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 467 days.

(21) Appl. No.: 18/171,907

(22) Filed: Feb. 21, 2023

(65) Prior Publication Data

US 2024/0089782 A1     Mar. 14, 2024

Related U.S. Application Data

(63) Continuation-in-part of application No. 17/931,949, filed on Sep. 14, 2022.

(51) Int. Cl.
H04W 28/02        (2009.01)
H04W 28/08        (2023.01)
H04W 72/1263     (2023.01)

(52) U.S. Cl.
CPC ...  H04W 28/0236 (2013.01); H04W 28/0908 (2020.05); H04W 72/1263 (2013.01)

(58) Field of Classification Search
None
See application file for complete search history.

(56) References Cited

U.S. PATENT DOCUMENTS

| | | |
|---|---|---|
| 2021/0027415 A1 | 1/2021 | Khalid et al. |
| 2021/0367904 A1 | 11/2021 | Park |
| 2022/0028172 A1 | 1/2022 | Yip |
| 2022/0222583 A1 * | 7/2022 | Wouhaybi ............... H04L 67/10 |
| 2022/0232605 A1 | 7/2022 | Kim |
| 2022/0346077 A1 | 10/2022 | Zhu |
| 2023/0199198 A1 | 6/2023 | Stoica |
| 2023/0318982 A1 | 10/2023 | Mondet |
| 2023/0345298 A1 * | 10/2023 | Lee ........................ H04L 47/564 |
| 2024/0049047 A1 | 2/2024 | Yu |
| 2024/0259879 A1 | 8/2024 | Ranganath |
| 2024/0305533 A1 | 9/2024 | Bai |
| 2025/0056522 A1 * | 2/2025 | Zhang ........................ H04L 5/00 |

FOREIGN PATENT DOCUMENTS

| | | |
|---|---|---|
| WO | 2023/279865 | 1/2023 |
| WO | 2023/016294 | 2/2023 |
| WO | 2023/017621 | 2/2023 |
| WO | 2023/154429 | 8/2023 |

* cited by examiner

*Primary Examiner* — Kodzovi Acolatse

(57)        ABSTRACT

Systems and methods described herein provide intelligent scheduling in a radio access network (RAN). A RAN device receives traffic characterization model parameters and also receives data for a communication session with a User Equipment (UE) device. The RAN device identifies traffic characteristics for the communication session based on the traffic characterization model parameters. The traffic characteristics include a predicted level of periodicity for a future time interval. The RAN device selects a scheduling discipline for the communication session based on the projected level of periodicity for the future time interval, and implements the selected scheduling discipline for the communication session.

20 Claims, 9 Drawing Sheets

800

700

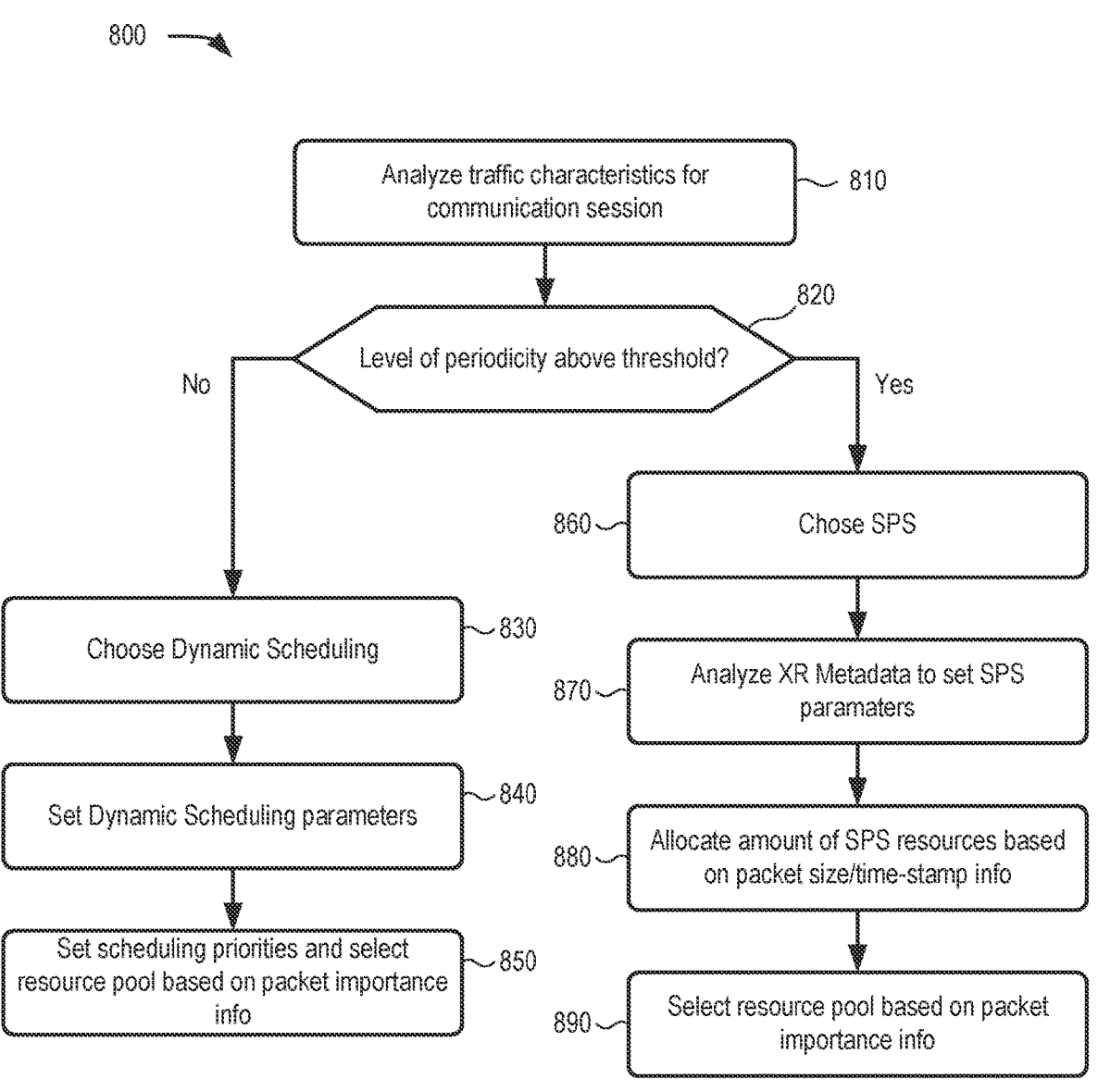

800

Analyze traffic characteristics for communication session — 810

Level of periodicity above threshold? 820

No

Yes

Chose SPS
860

Choose Dynamic Scheduling — 830

Analyze XR Metadata to set SPS paramaters
870

Set Dynamic Scheduling parameters — 840

Allocate amount of SPS resources based on packet size/time-stamp info
880

Set scheduling priorities and select resource pool based on packet importance info — 850

Select resource pool based on packet importance info
890

FIG. 8

SYSTEMS AND METHODS FOR RADIO SCHEDULING WITH BLIND TRAFFIC CHARACTERIZATION

CROSS-REFERENCE TO RELATED APPLICATION

This application is a continuation-in-part of U.S. patent application Ser. No. 17/931,949, filed on Sep. 14, 2022, and titled "Systems and Methods for XR-Aware Radio Scheduling," the contents of which are incorporated herein by reference.

BACKGROUND

New cellular networks (e.g., Fifth Generation (5G) networks) can provide various services and applications, to user devices, with optimized latency and quality of service. In the context of wireless networks, scheduling may generally be referred to as allocating resources for data transmission, such as transmissions over a radio interface between a base station and an end device. Optimal resource allocation for certain application traffic depends on the network knowing the application traffic characteristics, its quality of service (QoS) requirements, and/or network conditions. Application feedback (such as high-level data or metadata) would be useful for selecting a particular scheduling discipline, as well as for configuring scheduling parameters for a selected scheduling algorithm. However, an application traffic type or application metadata is not always available to the network to enable the correct choice of an appropriate scheduling scheme.

BRIEF DESCRIPTION OF THE DRAWINGS

FIGS. 7 and 8 are flow diagrams illustrating an exemplary process for dynamically implementing a scheduling discipline for a communication session, according to an implementation.

DETAILED DESCRIPTION OF EXAMPLE EMBODIMENTS

Figure 1:
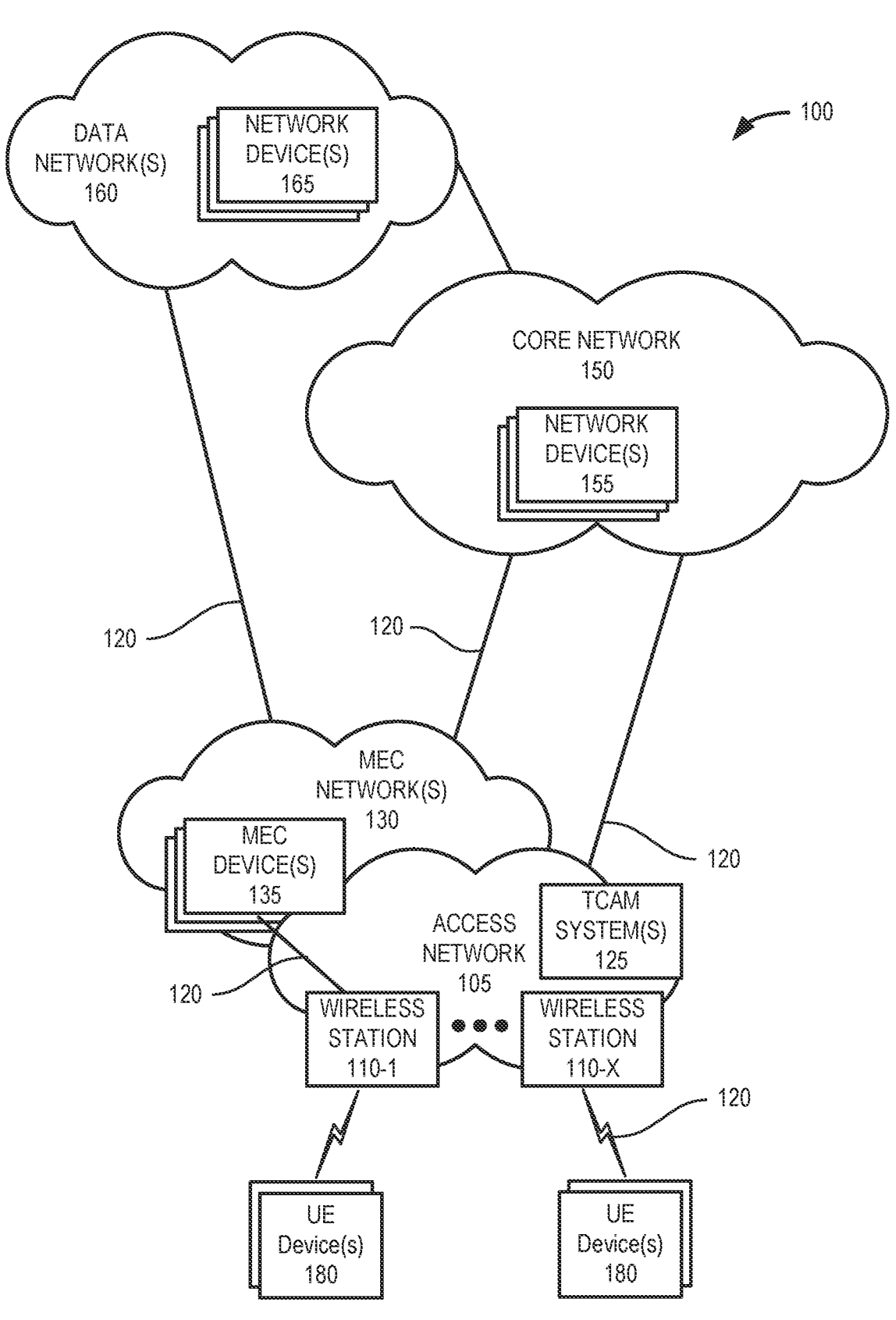
FIG. 1 is a diagram illustrating an exemplary environment in which embodiments may be implemented.

The following detailed description refers to the accompanying drawings. The same reference numbers in different drawings may identify the same or similar elements. Also, the following detailed description does not limit the invention.

Dynamic and semi-persistent scheduling schemes are two different scheduling mechanisms available in mobile networks and suited for different kinds of traffic. Semi-persistent scheduling (SPS) is typically used for services like voice (e.g., voice-over-IP), which have periodic traffic (e.g., fixed size packets arriving at regular periodic intervals) in both uplink (UL) and downlink (DL). With SPS-based resource allocation, a serving base station allocates at least a part of resources and transport formats to the end device semi-statically over a certain time interval. Using SPS for periodic traffic ensures regular availability of network resources for a service (e.g., an extended reality (XR) service, a gaming service, an industrial Internet of Things (IoT) service, etc.), thus ensuring a good user experience. Also, underutilized radio resources with SPS are minimal. Furthermore, there is little to no overhead associated with requesting grants that are typically needed for aperiodic traffic.

Dynamic scheduling (DS) uses control information to adjust the amount of UL/DL data that can be transferred over a radio interface. Dynamic scheduling is more suited for applications that involve a dynamic traffic pattern with no periodicity or having periodicity but with large jitter and variable packet sizes. For example, dynamic scheduling is more suited for a web browsing service because the traffic characteristics are not periodic and do not typically follow a specific pattern. In contrast with SPS, dynamic scheduling allows more flexibility in resource allocation for dynamic traffic. Using SPS for dynamic traffic would result in highly inefficient use of limited radio resources.

Thus, mobile networks can benefit from a correct selection of SPS or DS for certain application traffic. The optimal selection depends, for example, on the traffic characteristics, QoS requirements, and network conditions. If such information is not available, the network may not be able to select an optimal scheduling scheme.

Systems and methods described herein provide an intelligence function to optimize exchange of application traffic over a RAN. The systems and methods may implement blind traffic characterization (e.g., without the assistance of additional traffic information or metadata from an application server or a user device) based on artificial intelligence (AI)/machine learning (ML) (TCAM). The TCAM scheme may predict traffic characteristics to intelligently map quality of service (QoS) flows to data radio bearers (DRBs), select a scheduling discipline (e.g., SPS, DS, etc.), and configure scheduling parameters for the chosen discipline. Packet level importance may also be predicted to further help in scheduling.

According to an implementation, a RAN device provides intelligent scheduling in a RAN. The RAN device receives traffic characterization model parameters and also receives data for a communication session with a UE device. The RAN device identifies traffic characteristics for the communication session based on the traffic characterization model parameters. The traffic characteristics include a predicted level of periodicity for a future time interval. The RAN device selects a scheduling discipline for the communication session based on the projected level of periodicity for a future interval, and implements the selected scheduling discipline for the communication session.

FIG. 1 illustrates an exemplary environment 100 that includes an access network 105, one or more MEC networks 130, a core network 150, and one or more data networks 160. Access network 105 may include wireless stations 110-1 through 110-X (referred to collectively as wireless stations 110 and generally as wireless station 110). MEC network 130 may include MEC devices 135; core network 150 may include network devices 155; and data networks 160 may include network devices 165. Environment 100 further includes multiple user equipment (UE) devices 180 (referred to herein collectively as UEs 180 and individually as UE 180).

The number, the type, and the arrangement of network devices and the number of UEs 180 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, and/or another type of computing architecture.

Environment 100 includes communication links 120 between the networks, between the network devices, and between UEs 180 and the network devices. Environment 100 may be implemented to include wired, optical, and/or wireless communication links among the network devices and the networks illustrated. A connection via a communication link 120 may be direct or indirect. For example, an indirect connection may involve an intermediary device and/or an intermediary network not illustrated in FIG. 1. A direct connection may not involve an intermediary device and/or an intermediary network. The number and the arrangement of communication links 120 illustrated in environment 100 are exemplary.

Access network 105 may include one or multiple networks of one or multiple types and technologies. For example, access network 105 may include a 5G radio access network (RAN), a Fourth Generation (4G) RAN, and/or another type of future generation RAN. By way of further example, access network 105 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 105 may further include other types of wireless networks, such as a WI-FI network, a Worldwide Interoperability for Microwave Access (WiMAX) network, a local area network (LAN), or another type of network that may provide an on-ramp to wireless stations 110 and/or core network 150.

Depending on the implementation, access network 105 may include one or multiple types of wireless stations 110. For example, wireless station 110 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 105 may be implemented according to various wireless technologies (e.g., radio access technology (RAT), etc.), wireless standards, wireless frequencies/bands, and so forth. According to an implementation, wireless stations 110 may include both eNBs and gNBs.

In some implementations, access network 105 may support separate control plane and user plane signaling. For example, a wireless station 110 implemented as a gNB may include multiple decomposed distributed components, such as a central unit (CU) with separate control plane and user plane functionality, a distributed unit (DU), a remote unit (RU) or a remote radio unit (RRU)), or another type of distributed arrangement. In other implementations, access network 105 may include open network devices (e.g., Open RAN (O-RAN) Centralized Unit (O-CU), O-RAN Distributed Unit (O-DU), O-RAN next generation Node B (O-gNB), O-RAN evolved Node B (O-eNB, etc.)), a future generation wireless access device, or another type of wireless node (e.g., a WiMax device, a hotspot device, etc.) that provides a wireless access service.

MEC network 130 (also referred to as an "application service layer network" or "edge network") may include a platform that provides application services, such as low latency services, at the edge of a network. For purposes of illustration and description, MEC devices 135 may include various types of network devices that may be resident in MEC network 130. MEC devices 135 may include variable compute configurations, including, without limitation, a central processing unit (CPU), a graphical processing unit (GPU), a field programmable gate array (FPGA), etc. MEC devices 135 may also include devices to perform orchestration and containerization functions. MEC devices 135 may be located to provide geographic proximity to various groups of wireless stations 110. In some embodiments, MEC devices 135 may be co-located with a wireless station 110 or with a component of a wireless station (e.g., a central unit of a gNB). In other embodiments, wireless stations 110 may connect to MEC network 130 via wired (e.g., optical) backhaul links 120. In other embodiments, MEC devices 135 may be co-located with elements of access network 105 and/or core network 150. As used herein, the term "co-located" may refer to elements that are located within the same platform or subsystem of environment 100.

MEC network 130 may be implemented using one or multiple technologies including, for example, network function virtualization (NFV), software defined networking (SDN), cloud computing, webscale, or another type of network technology. Depending on the implementation, MEC network 130 may include, for example, virtualized network functions (VNFs), containerized network functions (CNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

Core network 150 may include one or multiple networks of one or multiple network types and technologies. For example, core network 150 may be implemented to include an Evolved Packet Core (EPC) of an LTE network, an LTE-A network, an LTE-A Pro network, a Next Generation Core (NGC), a 5G Core Network (5GC) for a 5G network and/or a legacy core network. According to one implementation, core network 150 may include a non-standalone (NSA) core network to support dual coverage using 4G and 5G networks, referred to as interoperability Option 3x, or other 3GPP defined NSA-based architecture options. Core network 150 may manage communication sessions (e.g., PDU sessions) for UE devices 180. For example, core network 150 may establish an Internet Protocol (IP) connection between a UE 180 and a MEC device 135 in a particular MEC network 130 location. Furthermore, core network 150 may enable UE 180 to communicate with an application server or another type of network device 165 located in a particular data network 160.

Depending on the implementation, core network 150 may include various network elements that may be implemented in network devices 155. Such network elements may include a user plane function (UPF), a session management function (SMF), a core access and mobility management function (AMF), a unified data management (UDM), a packet data network (PDN) gateway (PGW), a mobility and management entity (MME), a serving gateway (SGW), a policy charging rules function (PCRF), a policy function (PCF), a policy control, a home subscriber server (HSS), as well other network elements pertaining to various network-related functions, such as billing, security, authentication and authorization, network polices, subscriber profiles, network slicing, and/or other network elements that facilitate the operation of core network 150. In the context of a core network that is configured to support 5G UE devices 180, core network 150 may include one or more network devices 155 with combined 4G and 5G functionality, such as a session management function with PDN gateway-control plane (SMF+PGW-C) and a user plane function with PDN gateway-user plane (UPF+PGW-U).

Data network 160 may include one or multiple networks. For example, data network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 160 may include various network devices 165 that provide various applications, services, or other type of user device assets (e.g., servers (e.g., web, application, cloud, etc.), mass storage devices, data center devices), and/or other types of network services pertaining to various network-related functions.

UE device 180 may include a device that has computational and wireless communication capabilities. UE device 180 may be implemented as a mobile device, a portable device, a stationary device, a device operated by a user, or a device not operated by a user. For example, UE device 180 may be implemented as an XR device for a VR system, AR system, or MR system; a game system; a smartphone; a Mobile Broadband device; a computer; a tablet; a wearable device (e.g., glasses, wristwatch, etc.); a vehicle support system; a drone; or some other type of wireless device. According to various exemplary embodiments, UE device 180 may include or be connected to a video camera or other video/audio equipment. UE device 180 may also be configured to execute various types of software (e.g., applications, programs, graphics processing, etc.). UE device 180 may support one or multiple RATs (e.g., 4G, 5G, etc.), one or multiple frequency bands, network slicing, dual-connectivity, and so forth. Additionally, UE device 180 may include one or multiple communication interfaces that provide one or multiple (e.g., simultaneous or non-simultaneous) connections via the same or different RATs, frequency bands, etc. According to an implementation, UE device 180 may be configured with or download a client application. The client application may be an XR-based application designed to use MEC resources, an industrial IoT application, an application subscribed to a high speed internet service, etc. UE device 180 or applications running on UE device 180 may be configured for certain types of communications in network environment 100. For example, UE device 180 may be associated with an identifier such as a network slice selection assistance information (NSSAI) that governs certain types of network traffic.

As further shown in FIG. 1, a TCAM system 125 may be included in access network 105. One or more modules of TCAM system 125 may be implemented, for example, by a wireless station 110 (e.g., a gNB). As described further herein, using a trained traffic characterization model, TCAM system 125 may predict traffic characteristics to intelligently map QoS flows to DRBs, select a scheduling discipline (e.g., SPS or DS), and configure scheduling parameters for the chosen discipline. TCAM system 125 may also predict packet level importance to further help in scheduling.

Figure 2:
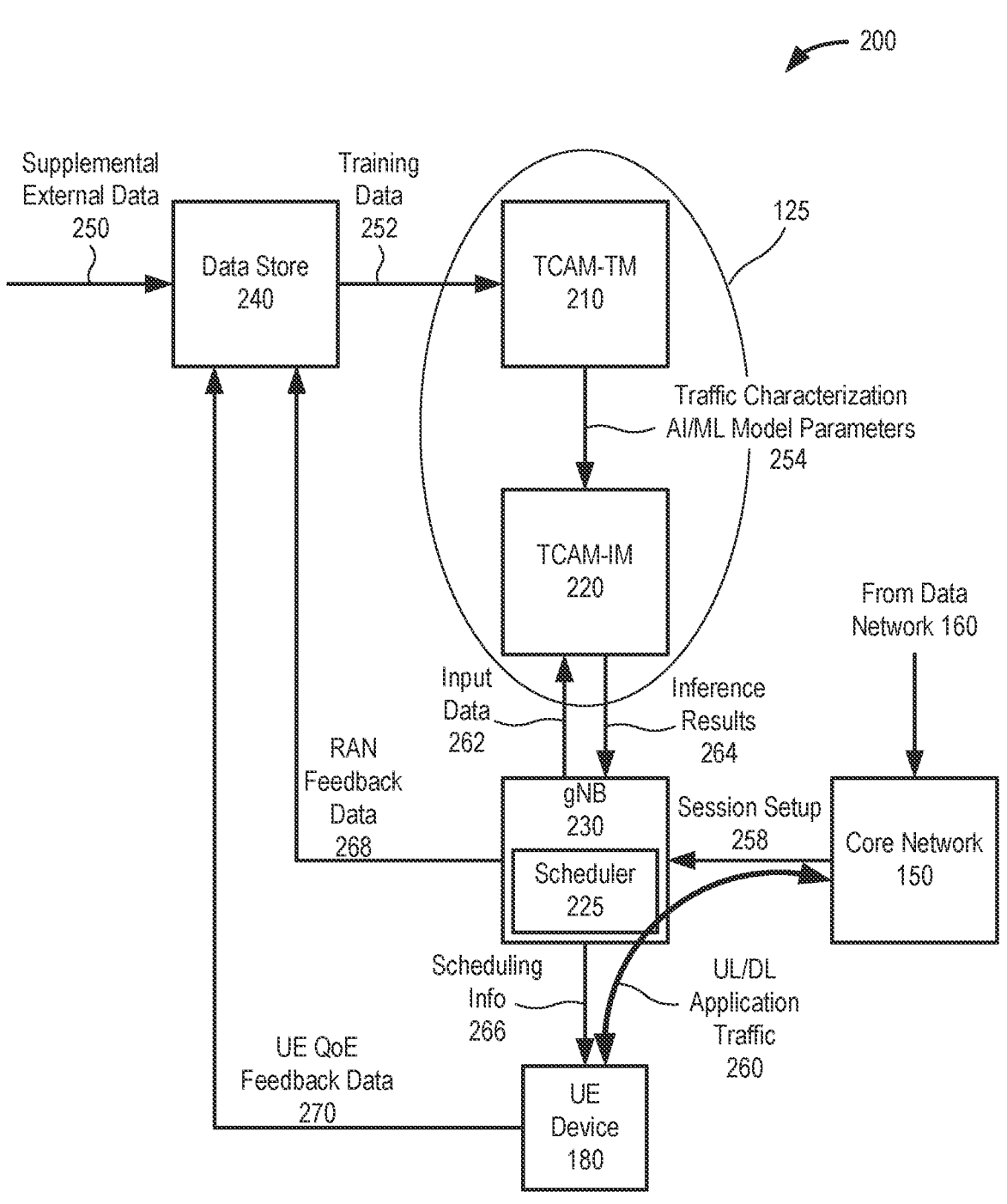
FIG. 2 is a diagram illustrating a generic architecture and communications for blind traffic characterization based on artificial intelligence (AI)/machine learning (ML) (TCAM)

FIG. 2 is a diagram illustrating communications to implement TCAM system 125 in a portion 200 of network environment 100. More particularly, FIG. 2 illustrates components of TCAM system 125 in communication with other components of environment 100. Environment 200 may include a blind TCAM training module (TCAM-TM) 210 and a TCAM inference module (TCAM-IM) 220 for TCAM system 125. Environment 200 may also include a gNodeB (gNB) 230, a data store 240, core network 150, and UE device 180.

UE device 180 may execute a client application that provides a service to a user. The user experience for the application may be affected by the network's resource allocation for the application traffic, such as application traffic between UE device 180 and an application server (e.g., a network device 165 in data network 160).

Each gNB 230 may correspond to a wireless station 110. gNB 230 may transfer traffic from an application server, for example, in a data network 160 (via core network 150) to UE device 180 and/or transfer data from UE device 180 to data network 160. According to an implementation described herein, gNB 230 may include a scheduler 225 that may implement instructions from TCAM-IM 220 to schedule use of resources (e.g., resource blocks in a physical layer) to optimize delivery of UL traffic from UE devices 180 and DL traffic from gNB 230. Scheduler 225 may schedule use of resources for multiple devices and/or sessions in a geographical area (e.g., a cell or sector) serviced by gNB 230.

Data store 240 may receive, compile, and store data that may be used to generate and train a TCAM model (also referred to herein as a "traffic characterization model"). Data store 240 may, for example, receive RAN feedback data from gNB 230, quality of experience (QoE) data feedback data from UE device 180, and supplemental external data 250 from other network sources. Data store 240 may provide compiled data and/or ongoing feedback data to TCAM-TM 210 as training data.

TCAM-TM 210 may generate an AI/ML model to govern selection of an optimal scheduling discipline (e.g., DS, SPS, etc.) based on blind traffic characterization. TCAM-TM 210 may receive training data from data store 240 and train a TCAM model. TCAM-TM 210 may provide TCAM model parameters to TCAM-IM 220 for real-time/near-real-time operation.

TCAM-IM 220 may host/apply the TCAM model, which is trained by TCAM-TM 210. TCAM-IM 220 may blindly analyze characteristics of incoming traffic for each DRB and predict the level of periodicity of the data for a future time interval, T. Also, TCAM-IM 220 may predict the packet size variation and jitter of arriving packets. In general, if the level of periodicity is very strong (greater than a certain threshold), packet sizes are stable and jitter is small, then SPS may be selected for the DRB. Otherwise, dynamic scheduling may be chosen for the DRB. Scheduling selection is described further in connection with FIGS. 4 and 8, for example. In operation, data store 240 may be supplied with supplemental external data 250 (e.g., network data, subscription data, slicing data, historical session data, etc.), along with continuing updates of RAN feedback data 268 and UE QoS feedback data 270. Data store 240 may supply the data as training data 252 to TCAM-TM 210. TCAM-TM 210 may train a TCAM model and provide TCAM model parameters 254 to TCAM-IM 220. At some point after TCAM model parameters are available, UE device 180 may establish a session with a data network 160, core network 150 may provide session setup information to gNB 230, and UE device 180 may begin exchanging UL and DL application traffic 260.

From application traffic 260 and/or session setup data 258, gNB 230 may collect input data 262, which may be provided to TCAM-IM 220 (e.g., in real-time). Input data 262 may include, for example, UE subscription information (e.g., information identifying particular services to which UE device 180 is subscribed), input data packet arrival time stamps, input data packet sizes, network slicing information (e.g., Single-Network Slice Selection Assistance Information (S-NSSAI)) of arriving packets, a QoS Flow Identifier of input data, UE location information (of UE device 180), and UE QoE feedback information (from UE device 180).

TCAM-IM 220 may receive input data 262 and apply the TCAM model parameters to perform blind traffic characterization of application traffic 260. Particularly, TCAM-IM 220 may provide inference results 264 to gNB 230. Inference results 264 may include, for example, a scheduling discipline/type selection (e.g., SPS or DS) and applicable parameters for the selected scheduling type. According to one implementation, inference results 264 may include a traffic periodicity classification, a validity duration for the TCAM-IM 220 prediction, dynamic updates for the prediction, QoS flow to DRB mapping, the scheduling discipline choice (e.g., SPS or DS), a packet importance prediction (e.g., for packets in application traffic 260), and resource pool mapping.

Depending on the type of scheduling selected, inference results 264 may also include additional parameters for tuning SPS or DS. For SPS, additional parameters in inference results 264 may include a time period and data volume per time period, a DRB mapping to SPS bin (as described further in connection with FIG. 5), SPS parameters (e.g., time period, resource allocation), and additional DS, if needed. For DS, additional parameters in inference results 264 may include DS priorities per DRB, periodic DS based on Downlink Control Information (DCI), and a resource pool selection.

Based on inference results 264, gNB 230 (e.g., scheduler 225) may provide scheduling information 266 to implement the selected scheduling discipline and parameters with UE device 180. Upon implementation of the selected scheduling discipline, gNB 230 may provide RAN feedback data 268 and UE device 180 may provide UE QoE feedback data 270 that may be compiled by data store 240 for further training of the TCAM model.

Figure 3A:
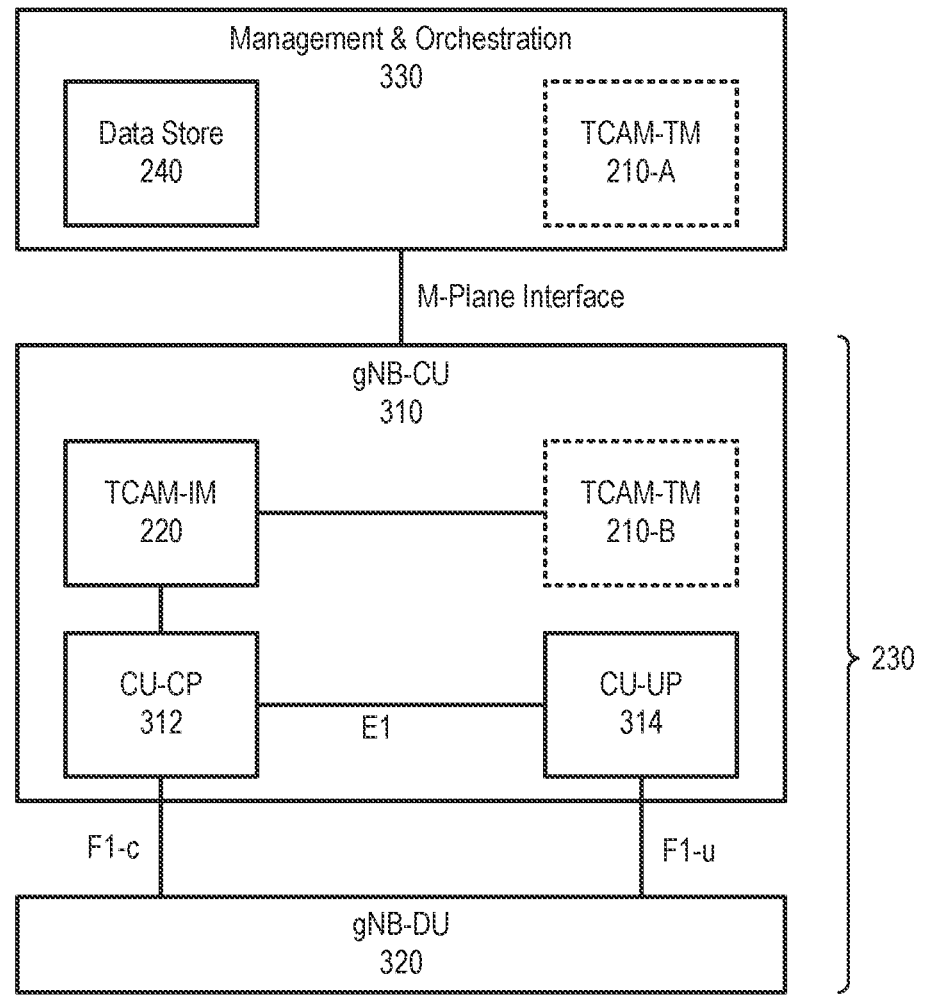
FIG. 3A is a diagram illustrating an example TCAM system architecture according to an implementation.
Figure 3B:
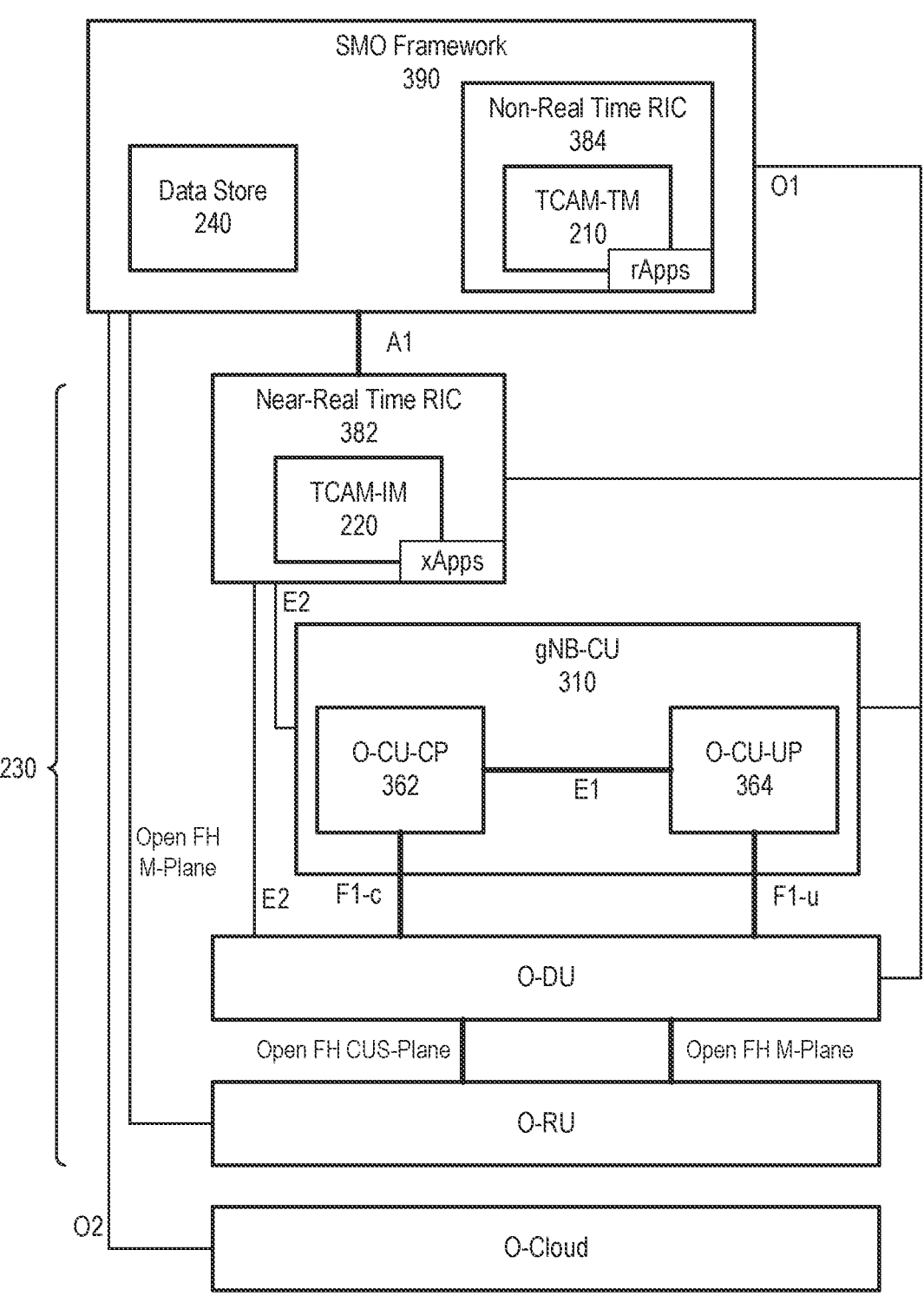
FIG. 3B is a diagram illustrating an example TCAM system architecture according to another implementation.

FIGS. 3A and 3B are diagrams illustrating different TCAM architectures. FIG. 3A shows implementations of blind TCAM in a classic 3GPP architecture. FIG. 3B shows an implementation of blind TCAM in an O-RAN architecture.

Referring collectively to FIGS. 3A and 3B, TCAM-IM 220 may be located close to scheduler 225 (e.g., in gNB 230) to be able to make scheduling decisions in real-time or near-real-time. Conversely, TCAM-TM 210 needs access to data, as well as large compute power, to be able to train the TCAM model. The model training may occur on a larger time scale (e.g., non-RT time scale). Thus, TCAM-TM 210 can be located either near/within a gNB 230 or in a management and orchestration framework.

Referring to FIG. 3A, in a classic 5G architecture, gNB 230 may include a central unit (gNB-CU) 310 and a distributed unit (gNB-DU) 320. The gNB-CU 310 may control the transport of data (e.g., data packets) received via wireless RF transmissions from a UE device 180 and may control the transport of data from the wireless network to a DU 320 for wireless transmission to a destination UE device 180. As shown, CU 205 may be divided into two subcomponents: CU-control plane (CU-CP) 312 and CU-user plane (CU-UP) 314.

The CU-CP 312 includes a logical node that hosts Radio Resource Control (RRC) and other control plane functions (e.g., Service Data Adaptation Protocol (SDAP), and Packet Data Convergence Protocol (PDCP)). The CU-UP 314 includes a logical node that hosts user plane functions, such as, for example, data routing and transport functions.

The gNB-DU 320 may, in some implementations, include multiple DUs. Each DU of the multiple DUs includes a logical node that hosts functions associated with the Radio Link Control layer, the Medium Access Control (MAC) layer, and the physical layer (PHY). In some implementations, the DU 320 may host scheduler 225 (not shown in FIG. 3A).

Management and orchestration plane 330 may include data store 240. The gNB-CU 310 may communicate with a management and orchestration plane 330 via an M-plane interface. CU-CP 312 may communicate with gNB-DU 320 via an F1-c interface. CU-UP 314 may communicate with gNB-DU 320 via an F1-u interface.

In the configuration of FIG. 3A, TCAM-IM 220 may be located within gNB-CU 310, so as to coordinate scheduling decisions by scheduler 225 in real-time or near-real-time. The TCAM-TM 210 be located within management and orchestration plane 330, as shown by TCAM-TM 210-A, or located within gNB-CU 310, as shown by TCAM-TM 210-B. When implemented as TCAM-TM 210-A, model training parameters are conveyed from TCAM-TM 210-A to TCAM-IM 220 using the M-plane interface (which may be operator-designed or mimic an O-RAN A1 interface).

Referring to FIG. 3B, in an O-RAN architecture, gNB 230 may include CU (gNB-CU) 310, a DU (O-DU) 370 and a RIC system 380. CU 310 may be divided into two subcomponents: O-RAN CU-CP (O-CU-CP) 362 and O-RAN CU-UP (O-CU-UP) 364. The gNB-CU 310 and O-DU 370 may provide similar functionality as gNB-CU 310 and gNB-DU 320 described above.

RIC system 380 may use artificial intelligence (AI)-enabled policies and machine learning (ML)-based models to optimize network performance. RIC system 380 may include a near-real time RIC 382 and a non-real time RIC 384. Near-real time RIC 382 and a non-real time RIC 384 may be implemented as functional layers of a single component (e.g., a single RIC device) or as separate components. For example, as shown in FIG. 3B, non-real time RIC 384 may be included in a Service Management & Orchestration Framework 390, while a near-real time RIC 382 may be included within an gNB 230 or a MEC device 135.

TCAM-TM 210 may be part of non-real time RIC 384. In one implementation, TCAM-TM 210 may be implemented as an rApp (e.g., a specialized microservice for a non-real-time RIC under the O-RAN Alliance). TCAM-TM 210 may be part of near-real time RIC 382. In one implementation, TCAM-IM 220 may be implemented as an xApp (e.g., a specialized microservice for a near-real-time RIC under the O-RAN Alliance). An A1 interface between the SMO framework 390 may be used to convey model training parameters from TCAM-TM 210 to TCAM-IM 220. TCAM-TM 210 may use input data from data store 240 to train the TCAM model. Data store 240 may be located within SMO framework 390.

Although FIGS. 2-3B show exemplary arrangements for implementing TCAM system 125, in other implementations, different components, differently-arranged components, or additional components may be used than depicted herein. Additionally, or alternatively, one or more components of environment 200 may perform functions described as being performed by one or more other components of environment 200.

Figure 4:
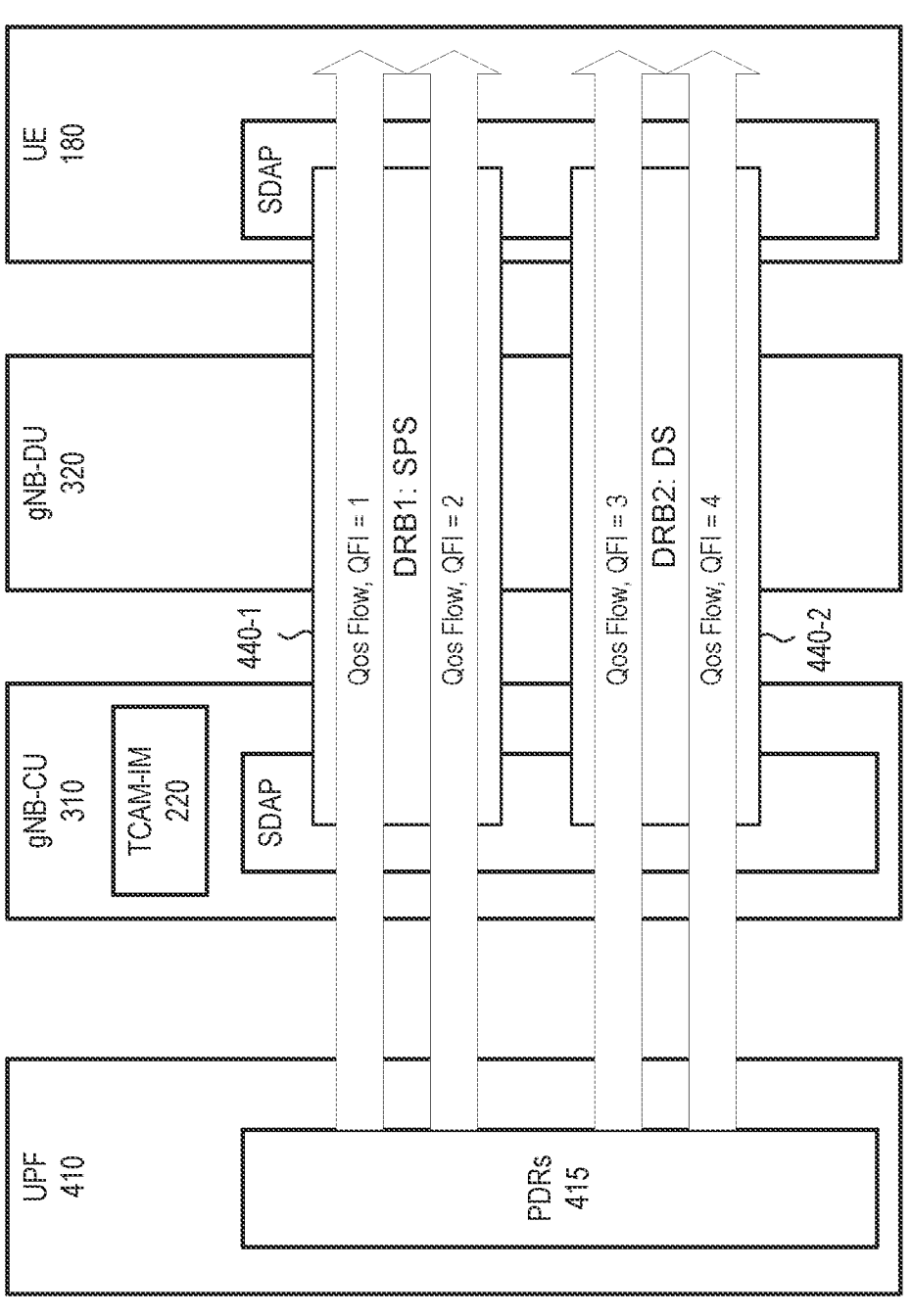
FIG. 4 is a diagram illustrating quality of service (QoS) mapping to data radio bearers (DRBs), according to an implementation.

FIG. 4 is a diagram illustrating quality of service (QoS) mapping to DRBs in a portion 400 of network environment 100. Network portion 400 may include UE device 180, gNB-CU 310, gNB-DU 320, and UPF 410.

UPF 410 may correspond to one of network devices 155. UPF 410 may be configured with packet detection rules (PDRs) 415. For example, another network device 155 (e.g., an SMF) may provide PDRs 415 to UPF 410 (e.g., via a control plane connection). PDRs 415 may include packet data information that indicates application identifiers, host names, FQDNs, and/or other types of information that may identify application services and correlated information that may indicate application traffic detected by UPF 410. For example, the PDRs may configure UPF 410 to assign a particular QoS flow for particular application traffic. Each gNB-CU 310 (e.g., CU-UP 314) and UE device 180 may include a processing layer that comprises a Service Data Adaptation Protocol (SDAP).

QoS support in 5G involves two a two-level mapping. In the DL, for example, UPF 410 may map DL packets to QoS flows based on configured PDRs 415. Then, the SDAP layer in gNB-CU 310 maps QoS flows to DRBs. The DRB is the level of granularity at which traffic is treated at the RAN. Packets belonging to the same DRB will receive similar treatment.

Traditionally, mapping from QoS flow to DRB is done based on QoS parameters only. According to implementations described herein, intelligent QoS flow to DRB mapping is used, based on TCAM analysis of QoS requirements and traffic characteristics. This intelligent QoS flow to DRB mapping may be done dynamically, considering traffic periodicity.

In implementations described herein, gNB-CU 310 may select the scheduling discipline of each DRB based on blind traffic characterization using AI/ML methods provided from TCAM-IM 220. That is, the TCAM-IM 220 output to SDAP works on a DRB granularity.

In the example of FIG. 4, DRB 440-1 ("DRB1") uses SPS and DRB 440-2 ("DRB2") uses DS. The scheduling method of DRB1 and DRB2 can change dynamically over time depending on traffic characterization of data. The gNB-CU 310 may analyze the traffic characterization data for a future time interval, T, to determine the level of periodicity on a statistical basis. TCAM-IM 220 may blindly analyze characteristics of incoming data for each DRB and predict the level of periodicity of the data for the future time interval, T. Also, TCAM-IM 220 may predict the packet size variation and jitter of arriving packets. If the level of periodicity is very strong (greater than a certain threshold), packet sizes are stable, and jitter is small, then SPS may be selected for a DRB. Otherwise, gNB-CU 310 may select dynamic scheduling for the DRB.

Figure 5:
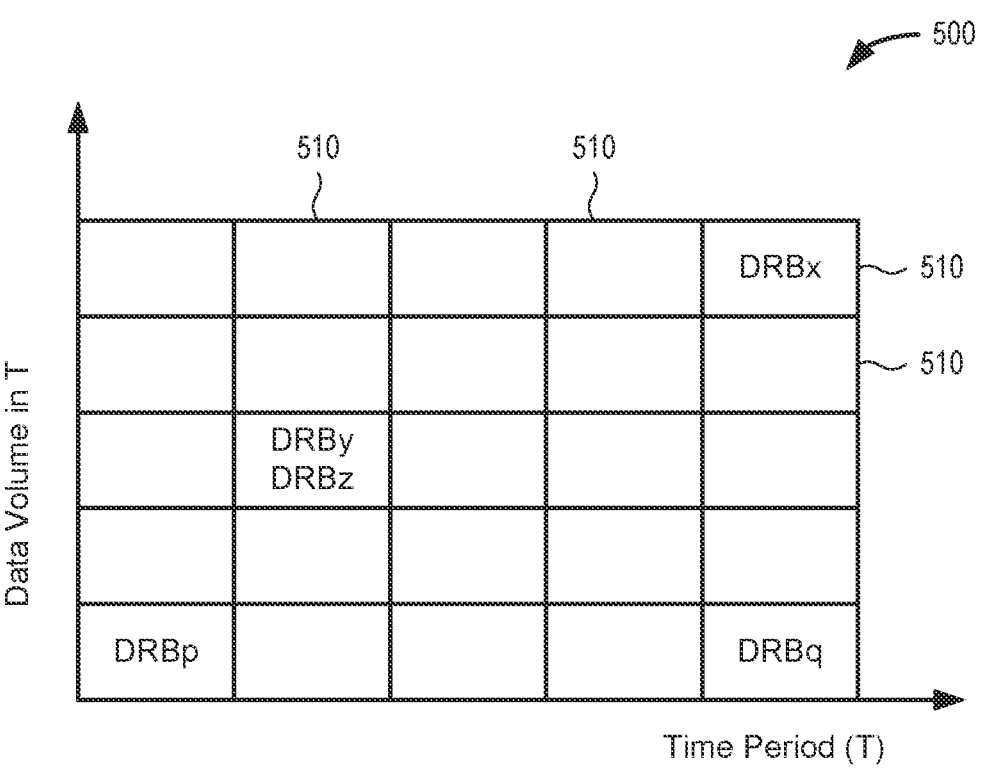
FIG. 5 is a chart illustrating an example of mapping DRBs to semi-persistent scheduling (SPS) bins.

TCAM-IM 220 may group DRBs into categories with different SPS characteristics depending on the traffic data. FIG. 5 is a chart 500 illustrating an example of mapping DRBs to SPS bins 510 that may be used by gNB-CU 310. In the example of FIG. 5, a DRB may be assigned to one bin, and multiple DRBs may be assigned to the same bin 510.

TCAM-IM 220 may estimate the time period, T, as well as data volume in time period T for each DRB. TCAM-IM 220 then maps the DRB to one of the bins 510 as shown in the example of FIG. 5. Different DRBs (e.g., DRBp, DRBq, etc.) could be mapped to different bins 510 depending on their specific traffic characteristics. Also, multiple DRBs (e.g., DRBy, DRBx) can be mapped to the same bin 510. For each bin, SPS parameters may be optimized and configured to be applied on a per UE basis.

Referring again to FIG. 4, in the event that DS is selected for a DRB, the DRB may be allocated DS priority info to optimize prioritization among different DRBs. Also, resource pool may be selected for each DRB based on their relative priorities. According to an implementation, a weighted packet forwarding (PF) scheme may be used where the scheduling priorities are weighted per their importance. The resource pool may be selected, for example, from one of prioritized, shared best effort, preemptable resources pools.

Figure 6:
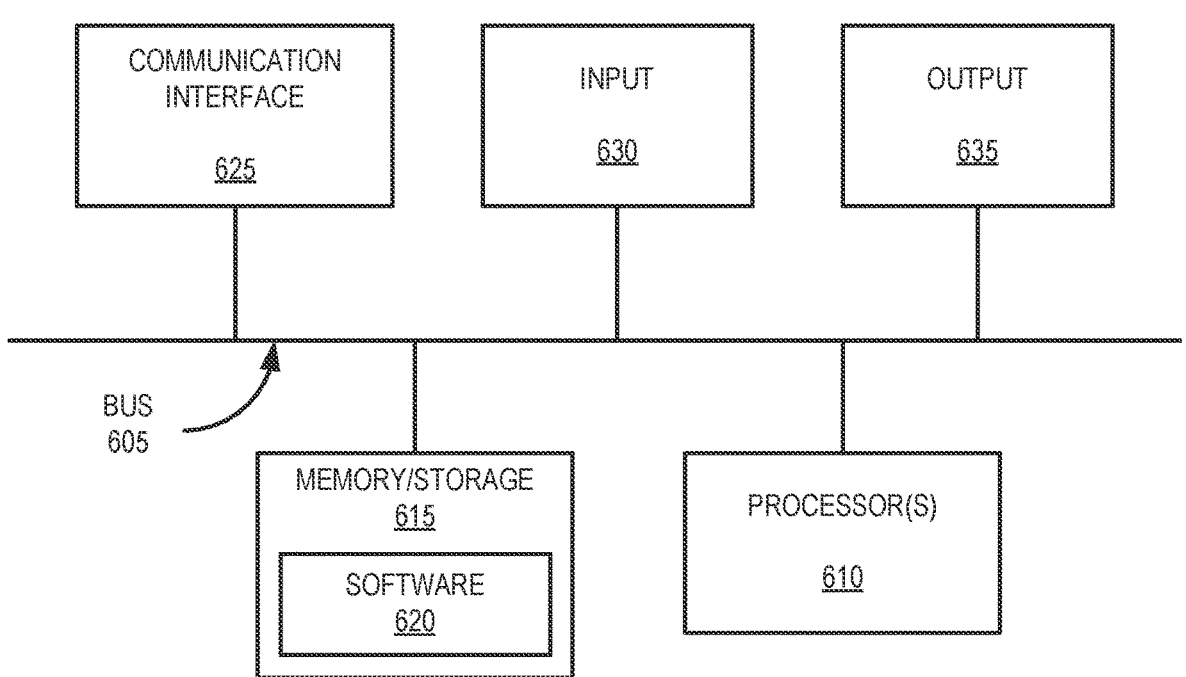
FIG. 6 is a diagram illustrating exemplary components of a device that may correspond to one or more of the devices illustrated and described herein.

FIG. 6 is a diagram illustrating exemplary components of a device 600 that may be included in one or more of the devices described herein. For example, device 600 may correspond to elements of wireless station 110 (e.g., gNB-CU 310, etc.), MEC device 135, network device 155, network device 165, UE device 180, gNB 230, scheduler 225, TCAM-TM 210, TCAM-IM 220, and/or other types of network devices, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 6D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium. Memory/storage 615 may store data, software, and/or instructions related to the operation of device 600.

Software 620 includes an application or a program that provides a function and/or a process. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers (e.g., RF transceivers). Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, API, etc.). Communication interface 625 may be implemented as a point-to-point interface, a service-based interface, or a reference interface, for example.

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, edge, etc.) and according to various network architectures (e.g., a virtualized function, etc.). Device 600 may be implemented in the same manner. For example, device 600 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., MEC network 130) and/or another type of network.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
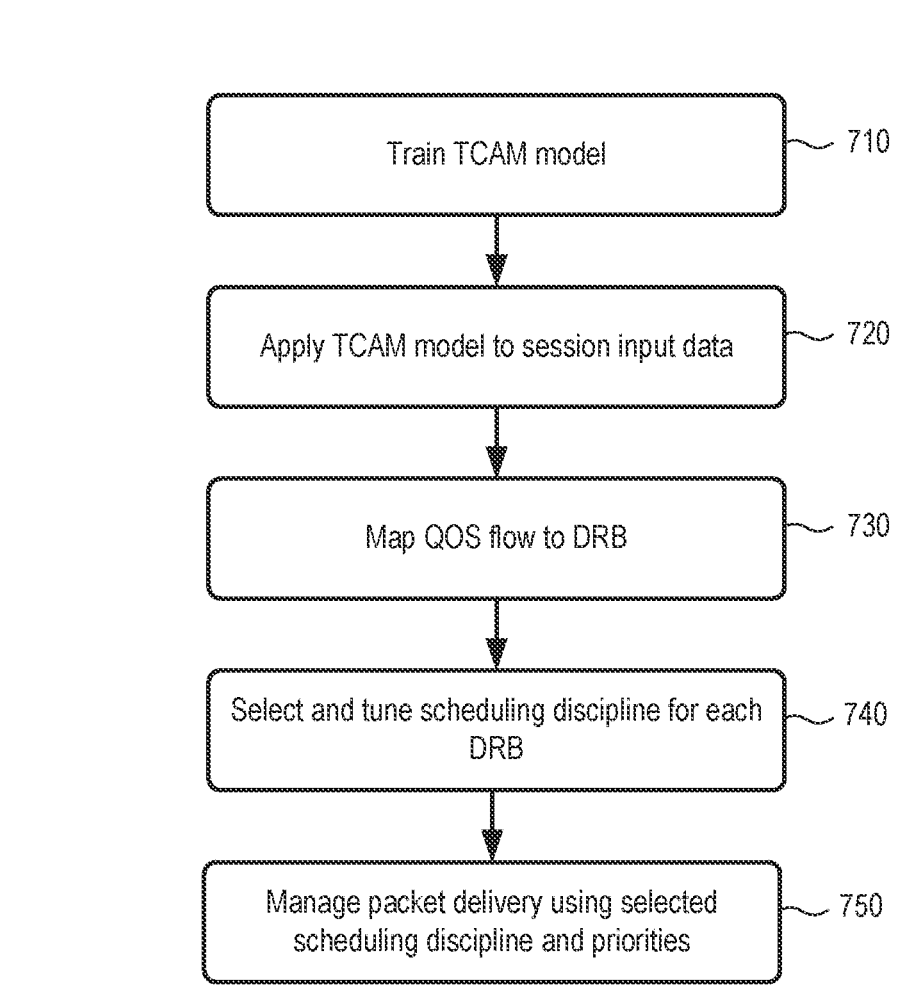

FIG. 7 is a flow diagram illustrating a process 700 for dynamically implementing a scheduling discipline for an application session. According to an implementation, process 700 may be performed, for example, by gNB 230 using TCAM system 125. According to an implementation, processor 610 executes software 620, such as TCAM-IM 220, to perform steps of process 700, as described herein. Alternatively, a step may be performed by execution of only hardware. In other implementations, process 700 may be performed by gNB 230 in conjunction with one or more other devices or functions in network portion 200.

Process 700 may include training a TCAM model (block 710) and applying the TCAM model to session input data (block 720). For example, TCAM-TM 210 may receive training data 252 from data store 240 and generate an AI/ML model to govern selection of a scheduling discipline (e.g., DS, SPS, etc.) based on blind traffic characterization. TCAM-IM 220 may receive the trained model and blindly analyze characteristics of incoming data for each DRB and predict the level of periodicity of the data for a future time interval, T. Also, TCAM-IM 220 may predict the packet size variation and jitter of arriving packets.

Process 700 may further include mapping QoS flows to DRBs (block 730). For example, gNB 230 may perform intelligent QoS flow to DRB mapping based on both analysis of QoS requirements and traffic characteristics. gNB 230/TCAM-IM 220 may blindly analyze characteristics of incoming data for each DRB and predict the level of periodicity of the data for a future interval T. The gNB 230 may also predict the packet size variation and jitter of arriving packets. Packets with similar QoS requirements and traffic characteristics may be mapped to the same DRB, where packets belonging to the same DRB receive similar treatment. In some implementations, the intelligent QoS flow to DRB mapping may be done dynamically, considering traffic periodicity.

Process 700 may further include selecting and tuning a scheduling discipline for each DRB (block 740) and managing packet delivery using the selected scheduling discipline and priorities (block 750). For example, gNB 230 may assign a DRB to one of an SPS or DS discipline. If the projected level of periodicity for a future interval is very strong (greater than a certain threshold), packet sizes are stable, and jitter is small, then SPS is chosen; otherwise, DS is chosen for the DRB. Selecting and tuning a scheduling discipline is described further in connection with FIG. 8. Once a scheduling disciple is chosen, gNB 230 may implement the selected scheduling discipline and parameters until a dynamic update is provided or the communication session ends.

FIG. 8 is a flow diagram illustrating a process 800 for selecting and tuning a scheduling discipline for a communications session. According to an implementation, process 800 may be performed, for example, by a gNB 230 using TCAM system 125. In other implementations, process 800 may be performed by gNB 230 in conjunction with one or more other devices or functions in environment 200.

Process 800 may include analyzing traffic characteristics for a communication session (block 810), and determining if the level of periodicity is above a threshold (block 820). For example, gNB 230 230 may provide input data (e.g., input data 264) for TCAM-IM 220 to make an initial blind traffic characterization. For example, TCAM-IM 220 may apply TCAM model parameters to determine a projected level of periodicity (e.g., a likelihood of consistent traffic pattern) for a future time interval, T. According to one implementation, TCAM-IM 220 may apply arrival time stamps and packet sizes of session data. In other implementations, TCAM-IM 220 may also apply packet network slicing data (S-NSSAI) and QoS flow data. In one implementation, TCAM-IM 220 may apply different periodicity thresholds for different traffic characteristics.

If the level of periodicity is not above a threshold (block 820—No), process 800 may include choosing dynamic scheduling (block 830), setting the dynamic scheduling parameters based on further analysis of the traffic characteristics (block 840), and setting scheduling priorities and selecting a resource pool based on packet importance information (block 850). For example, if the traffic characteristics applied to TCAM model parameters 254 do not provide an indication of periodicity (e.g., above a threshold level determined in the TCAM model parameters), TCAM-IM 220 may select dynamic scheduling as an initial setting for the session. The dynamic scheduling parameters may be chosen based on further analysis of the traffic characteristics. In particular, scheduling priorities for the communication session packets may be set according to traffic characteristics determined in TCAM model parameters 254. According to an implementation, a weighted packet forwarding (PF) scheme may be used where the scheduling priorities are weighted per their importance. In addition, a resource pool (e.g., prioritized or shared best effort or preemptable) may be set according to packet importance information.

If the level of periodicity is above a threshold (block 820—Yes), process 800 may include choosing SPS (block 860), setting SPS parameters (bock 870), allocating an amount of SPS resources based on packet size and/or time-stamp information (block 880), and selecting a resource pool based on packet importance information (block 890). For example, if the traffic characteristics, as applied to TCAM model parameters 254, provide an indication of periodicity (e.g., at or above a threshold level), TCAM-IM 220 may set parameters of SPS (e.g., an amount of resources allocated at different times, time period, etc.) based on further analysis of the traffic characteristics. In contrast with traditional SPS, which only allocates a fixed amount of radio resources periodically for a period of time, implementations described herein may tailor the allocation of radio resources to the needs of a communication session, which can vary even within a time period. The packet size info and time stamps in the traffic characteristics may be used to allocate different amounts of resources at different times. In addition, the packet importance may be used to determine the resource pool (e.g., prioritized or shared best effort or preemptable) from which resources are allocated at different times. For example, DRBs for sessions indicated as more important may be allocated resources from a prioritized resource pool, while DRBs for sessions indicated as less important may be allocated resources from a shared best effort resource pool.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of communications have been described with regard to FIG. 2 and series of blocks have been described with regard to the processes illustrated in FIGS. 7 and 8, the order of the communications and blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:

receiving, by a network device in a radio access network (RAN), traffic characterization model parameters, wherein the traffic characterization model parameters are based on training data;

receiving, by the network device and after receiving the traffic characterization model parameters, data packets for a communication session with a User Equipment (UE) device;

performing, by the network device, blind traffic characterization for the communication session based on the traffic characterization model parameters, wherein traffic characteristics identified by the blind traffic characterization include a predicted level of periodicity for a future time interval;

selecting, by the network device, a scheduling discipline for the communication session based on the predicted level of periodicity for the future time interval; and implementing, by the network device, the selected scheduling discipline for the communication session.

2. The method of claim 1, wherein selecting the scheduling discipline includes:

selecting between one of dynamic scheduling (DS) and semi-persistent scheduling (SPS).

3. The method of claim 1, wherein receiving the data packets for the communication session includes:

receiving the data packets for an active communication session between the UE device and a data network in real-time.

4. The method of claim 1, wherein the traffic characteristics identified by the blind traffic characterization further include a validity duration for the predicted level of periodicity.

5. The method of claim 1, wherein selecting the scheduling discipline includes:

performing quality of service (QoS) flow to data radio bearer (DRB) mapping based on analysis of QoS requirements and traffic characteristics.

6. The method of claim 1, wherein performing the blind traffic characterization for the communication session includes:

identifying, by the network device, the traffic characteristics for the communication session without assistance of additional traffic information from an application server or a user device.

7. The method of claim 1, wherein the data packets for the communication session includes one or more of:

packet arrival time stamps, packet sizes, and

UE device subscription information.

8. The method of claim 1, wherein selecting the scheduling discipline includes:

assigning a value corresponding to a packet importance ranking.

9. The method of claim 1, wherein selecting the scheduling discipline includes:

selecting the scheduling discipline for the communication session is further based on packet sizes and jitter in the communication session for the future time interval.

10. The method of claim 1, further comprising:

selecting, by the network device, a resource pool for implementing the selected scheduling discipline based on a packet importance ranking of packets in the communication session.

11. A radio access network (RAN) device comprising:

one or more processors configured to:

receive traffic characterization model parameters, wherein the traffic characterization model parameters are based on training data;

receive, after receiving the traffic characterization model parameters, data packets for a communication session with a User Equipment (UE) device;

perform blind traffic characterization for the communication session based on the traffic characterization model parameters, wherein traffic characteristics identified by the blind traffic characterization include a predicted level of periodicity for a future time interval;

select a scheduling discipline for the communication session based on the predicted level of periodicity for the future time interval; and implement the selected scheduling discipline for the communication session.

12. The RAN device of claim 11, wherein, when selecting the scheduling discipline, the one or more processors are further configured to:

select between one of dynamic scheduling (DS) and semi-persistent scheduling (SPS).

13. The RAN device of claim 11, wherein, when receiving the data packets for the communication session, the one or more processors are further configured to:

receive the data packets for an active communication session between the UE device and a data network in real-time.

14. The RAN device of claim 11, wherein the traffic characteristics identified by the blind traffic characterization further include a validity duration for the predicted level of periodicity.

15. The RAN device of claim 11, wherein the RAN device includes a gNodeB.

16. The RAN device of claim 11, wherein, when performing the blind traffic characterization for the communication session, the one or more processors are further configured to:

identify the traffic characteristics for the communication session without assistance of additional traffic information from an application server or a user device.

17. The RAN device of claim 11, wherein the RAN device includes a central unit (CU) device.

18. A non-transitory, computer-readable storage medium storing instructions, executable by a processor of a network device, for:

receiving, by the network device in a radio access network (RAN), traffic characterization model parameters, wherein the traffic characterization model parameters are based on training data;

receiving, by the network device and after receiving the traffic characterization model parameters, data packets for a communication session with a User Equipment (UE) device;

performing, by the network device, blind traffic characterization for the communication session based on the traffic characterization model parameters, wherein traffic characteristics identified by the blind traffic characterization include a predicted level of periodicity for a future time interval;

selecting, by the network device, a scheduling discipline for the communication session based on the predicted level of periodicity for the future time interval; and implementing, by the network device, the selected scheduling discipline for the communication session.

19. The non-transitory, computer-readable storage medium of claim 18, wherein the instructions for selecting the scheduling discipline are further for:

selecting between one of dynamic scheduling (DS) and semi-persistent scheduling (SPS).

20. The non-transitory, computer-readable storage medium of claim 18, wherein the instructions are further for:

selecting a resource pool for implementing the selected scheduling discipline based on a packet importance ranking of packets for the communication session.

\* \* \* \* \*